United States Patent [19]
Ueda et al.

[11] 3,898,473
[45] Aug. 5, 1975

[54] SENSING SYSTEM FOR SENSING STATE OF WEAR OF SEATBELT

[75] Inventors: Atsushi Ueda; Kosaku Uota; Mitsuaki Ishii, all of Himeji, Japan

[73] Assignee: Mitsubishi Denki Kabushiki Kaisha, Himeji, Japan

[22] Filed: Nov. 6, 1973

[21] Appl. No.: 413,200

[30] Foreign Application Priority Data
Dec. 18, 1972 Japan.................. 47-127398

[52] U.S. Cl. .................. 307/10 SB; 180/82 C
[51] Int. Cl. ............................................. H02g 3/00
[58] Field of Search .............. 307/10 SB; 180/82 C; 340/52 E; 200/61.58 B

[56] References Cited
UNITED STATES PATENTS
3,742,448 6/1973 Motz................................ 340/52 E
3,757,293 9/1973 Petersen......................... 307/10 SB Primary Examiner—Robert K. Schaefer
Assistant Examiner—M. Ginsburg
Attorney, Agent, or Firm—Wenderoth, Lind & Ponack

[57] ABSTRACT

The disclosed system for a motor vehicle comprises a seat switch adapted to be closed when a person sits on a seat, a belt switch adapted to be closed when the person wears a seatbelt and a FLIP-FLOP circuit including two NAND gates having two inputs connected to both switches respectively. Another NAND gate receives inputs from both the FLIP-FLOP circuit and the belt switch responds to the closure of the seat switch followed by the closure of the belt switch to provide an output to permit the associated engine to start.

4 Claims, 7 Drawing Figures

3,898,473

3,898,473

SENSING SYSTEM FOR SENSING STATE OF WEAR OF SEATBELT

BACKGROUND OF THE INVENTION

This invention relates to a sensor system for sensing a state of use of a seatbelt installed on the seat in motor vehicles or the like.

It is normally practiced to install the seatbelt in motor vehicles or like as a safety device but the percentage of seatbelts fastened by persons in motor vehicles is actually very low. This has sometimes resulted in the provision of a warning lamp and/or buzzer means for warning persons in motor vehicles or the like against their failing to wear the seatbelt. Alternatively, means has been, in some cases, provided for preventing the associated engine from starting as long as the seatbelt is not worn or improperly worn by the person. In the latter case it is required to sense the order as to whether the person would wear the seatbelt after his or her sitting down. To this end, the sitting of the person on the seat is, in many cases, sensed by a seat switch disposed in the seat to be actuated or closed in response to the body-weight of the person while the seatbelt put in the fastening state is sensed as by a belt switch disposed within a belt retractor involved. Thus the order in which the seat switch is first actuated and then the belt switch is actuated indicates that the seatbelt has been properly worn by the person. On the contrary, the actuation of the seat switch following the actuation of the belt switch indicates that the person has closed the seatbelt and then sat on the seat. This does not result in the person properly wearing the seatbelt. Further upon sensing the state of seatbelt wear there may occur such a malfunction that the proper seatbelt wear is decided to be improper because after the person has sat on the seat and is wearing the seatbelt, he or she floats above the seat to return the seat switch from its operating position to its inoperative position.

Accordingly it is an object of the present invention to provide a new and improved sensor system used with a motor vehicle or the like for sensing a state of seatbelt wear, prevented from malfunctioning due to the chattering of a seat switch involved resulting, for example, from a person with a seatbelt worn floating above his or her seat.

SUMMARY OF THE INVENTION

According to the principles of the present invention, there is provided a sensor system for sensing the state of seatbelt wear, comprising, in combination, a first switch responsive to the sitting of a person on a seat to be closed, a second switch responsive to closing of a seatbelt worn by the person, a FLIP-FLOP circuit including a pair of inputs connected to the first and second switches respectively and an output, the FLIP-FLOP circuit being operated in response to the operation of either of the first and second switches, a gate circuit including a pair of inputs connected to the output of the FLIP-FLOP circuit and the second switch respectively, and circuit means for locking a circuit for starting the associated engine, the locking circuit being responsive to an output provided by the gate circuit when the second switch is closed after the first switch has been closed to unlock the circuit for starting the engine.

BRIEF DESCRIPTION OF THE DRAWINGS

The present invention will become more apparent from the following detailed description taken in conjunction with the accompanying drawings in which.

DESCRIPTION OF THE PREFERRED EMBODIMENTS

Figure 1:
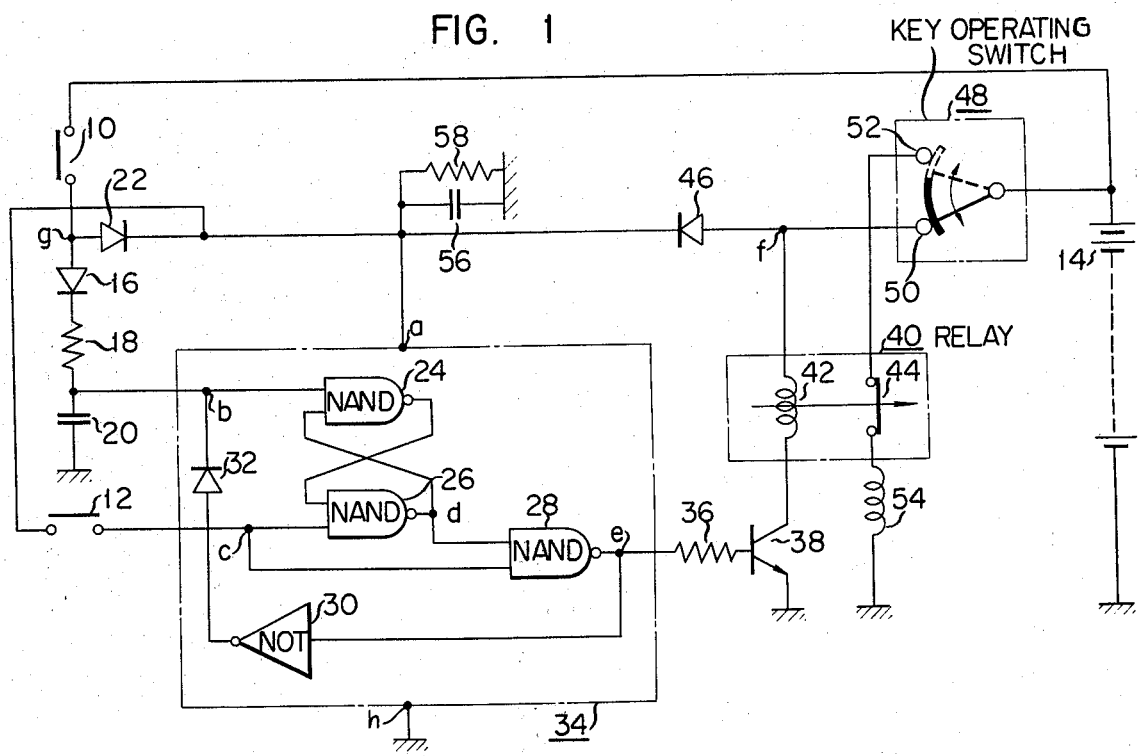
FIG. 1 is a schematic circuit diagram of a sensor system constructed in accordance with the principles of the present invention.

Referring now to the drawings and FIG. 1 in particular, it is seen that an arrangement disclosed herein comprises a normally open seat switch 10, a normally open belt switch 12 provided for a seat in a motor vehicle and a seat belt disposed in the seat although the motor vehicle, seat and seatbelt are not illustrated. The seat switch 10 is adapted to be closed in response to the sitting of person, such as a driver, on the seat and the belt switch 12 is adapted to be closed when the person is wearing the seatbelt. The seat switch 10 is connected at one side to a source of direct current 14 such as a battery equipped on the motor vehicle and at the other side to a series combination of a semiconductor diode 16, a resistor 18 and a capacitor 20. The source 14 is connected at the other end to ground. The diode 16 is so poled that a current flows from the switch 10 to the capacitor 20 connected to ground.

The junction of the switch and diode 10 and 16 respectively is connected to an anode electrode of a semiconductor diode 22 having a cathode electrode connected to the belt switch 12 at one side. The junction of the resistor 18 and capacitor 20 is connected to one input of a "NAND" gate 24, the other input thereof being connected to an output of another NAND gate 26. The NAND gate 26 includes one input connected to the output of the NAND gate 24 and the other input connected to the belt switch 12 at the other side. Therefore the NAND gates 24 and 26 form a FLIP-FLOP circuit. The output of the NAND gate 26 is connected to one input of a further NAND gate 28. NAND gate 28 has its other input connected to the other side of the belt switch 12 and an output connected to an input of a NOT gate 30. The NOT gate 30 includes an output connected through a semiconductor diode 32 to the one input of the NAND gate 24 and therefore to the other side of the seat switch 10 through the resistor and diode 18 and 16 respectively. The three NAND gates 24, 26 and 28, the NOT gate 30 and the diode 32 are formed into a single integrated circuit as designated by a block 34 in FIG. 1 serving to store a state of seatbelt wear as will be described hereinafter. The block 34 illustrates the essential portion of the integrated circuit, but not means for supplying electric power to the components thereof. However, a point $a$ shown in FIG. 1 designates a source terminal through which electrical power from the source is supplied to the various components and a point $h$ designates a ground terminal.

The output of the NAND gate 28 is also connected by a resistor 36 to a base electrode of a common emitter transistor 38 including a collector electrode connected to a relay generally designated by the reference numeral 40. The relay 40 includes an operating winding 42 connected at one end to the collector electrode of the transistor 38 and a set of normally closed contacts 44. The operating relay winding 42 is connected at the other end to an anode electrode of a semiconductor diode 46 including a cathode electrode connected to the cathode electrode of the diode 22.

The junction of diode 46 and relay winding 42 is connected to a key operating switch 48 for a motor vehicle or like at an ignition terminal 50. More specifically, the key operating switch 48 also includes starter terminal 52 connected to one contact of the relay contact set 44. The other contact of the relay contact set 44 is connected to ground through a starter winding 54.

As shown in FIG. 1, a conductor interconnecting both diodes 22 and 46 is connected to a source point $a$ on the memory circuit 34 and also to ground through a parallel combination of a capacitor and resistor 56 and 58, respectively, forming a time delay circuit having a predetermined time constant for purposes as will be apparent later.

In the example illustrated, the closure of the seat switch 10 followed by the closure of the belt switch 12 indicates that a person in the associated motor vehicle has properly worn the seat belt whereas the closure of the seat switch 10 following the closure of belt switch 12 does not result in the indication that the person has properly worn the seat belt. When the person is driving the motor vehicle after having properly worn the seatbelt, the person may often float above the seat, for example when the vehicles bounces due to bad road conditions or the person moves the vehicle backwardly while he or she looks behind. This results in the opening of the seat switch 10. When the person again sit down after he or she has floated above the seat, the now opened seat switch 10 is re-closed. This closure of the seat switch 10 is accomplished after the closure of the belt switch 12 because the latter is maintained in its closed position. Therefore, it indicates that the person has sat down on the seat after the wearing of the seatbelt. In other words, an abnormal condition is erroneously sensed although the person has properly worn the seat belt.

The present invention contemplates to eliminate that erroneous sensing of the abnormal condition. To this end, there is provided means for feeding back to the side of the seat switch a signal indicating that the person has properly put on the seatbelt thereby to give the result equal to that exhibited by the seat switch 10 in its closed position even though the latter is temporarily opened while the seat belt is maintained in fastened state, that is to say, the belt switch 12 is in its closed position. That result is given when the key operating switch 48 has its movable arm maintained in contact with the ignition terminal 50.

On the other hand, the integrated circuit 34 has electrical energy supplied thereto through the seat switch 10 and the ignition terminal 50. Therefore if the key operated switch 48 is not on the side of the ignition terminal 50 then the integrated circuit 34 has the electrical energy supplied thereto through the seat switch 10 alone. Under these circumstances, if the seat switch 10 is temporarily opened the integrated circuit 34 continues to be supplied with electrical energy only as long as the capacitor 56 has an electric charge accumulated thereon, resulting in the storage of the indication that the person has properly worn the seatbelt. However the closure of the seat switch 10 after the complete discharge of the capacitor 56 causes a malfunction because it is equivalent to the closure of the seat switch 10 after the closure of the belt switch 12.

From the foregoing it will be appreciated that with the key operating switch 48 having its movable arm disengaged from the ignition terminal 50, no malfunction is caused by the opening of the seat switch 10 for a time interval shorter than that determined by a time constant of the capacitor 56 and resistor 58. On the other hand, if the seat switch 10 is in its open position for a time interval longer than that corresponding to the time constant as above described then a malfunction will be caused. It is to be noted that the capacitor 56 and the resistor 58 can not have actually a very large time constant because the capacitor 56 is required to be of a high capacitance and also because of the use of a resistance too high in magnitude is practically difficult.

On the contrary, when the operating switch 48 is on the side of the ignition terminal 50, the opening of the seat switch 10 for a long time interval does not lead to a malfunction because the circuit 34 is energized through the ignition terminal 50.

Figure 2:
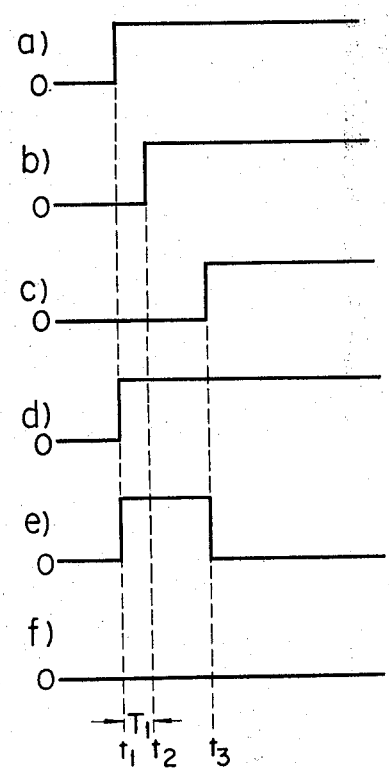
FIG. 2 is a graph illustrating waveforms developed at various points in the arrangement shown in FIG. 1 where the sitting is followed by the seatbelt wear.

The operation of the arrangement as shown in FIG. 1 will now be described. it is assumed that a person such as a driver has properly worn a seatbelt. That is, the person has sat on a seat and then put on the seatbelt. Under the assumed condition, waveforms as shown in FIGS. 2a through 2f are developed at various points in the arrangment of FIG. 1. As shown in FIG. 2, the person has sat on the seat at a time point of $t_1$ to close the seat switch 10 thereby to permit the source 14 to apply a source voltage to a source point $a$ (see FIG. 1) on the integrated circuit 34 resulting in the occurrence of a waveform shown in FIG. 2a at the point $a$. Then the input point $b$ (see FIG. 1) to the FLIP-FLOP circuit 24 - 26 or to the NAND gate 24 has the source voltage at a time point of $t_2$ lagging behind the time point of $t_1$ by a delay time $T_1$ as determined by the resistor 18 and the capacitor 20 connected to the input point $b$. That is, a waveform shown in FIG. 2b is developed at the input point $b$. While the FLIP-FLOP circuit, NAND gates 24 - 26, has the other input point $c$ connected to the belt switch 12 as shown in FIG. 1, that input point $c$ is still at the ground potential at the time point $t_2$ because the belt switch 12 is in its open position. As a result, the output point $d$ (see FIG. 1) of the FLIP-FLOP circuit or of the NAND gate 26 is maintained at the source voltage at which the output point $d$ has been put at the time point of $t_1$ (see FIG. 2d).

Then if the driver fastens the seatbelt to close the belt switch 12 at a time point of $t_3$ then the other input point $c$ to the FLIP-FLOP circuit 24 - 26 is set to the source voltage as shown in FIG. 2c while the output point $d$ of the NAND gate 26 remains at the source voltage. The source voltage at the input point $C$ is also applied to the NAND gate 28 along with the source voltage at the point $d$ to trigger its output point $e$ (see FIG. 1) from the source voltage to the ground voltage as shown in FIG. 2e. As shown in FIG. 2c, the output point $e$ has been set to the source voltage at time $t_3$.

If the key operating switch 48 is set to the side of the ignition terminal 50 with the output point $e$ maintained at the source voltage then the source voltage applied to the base electrode of transistor 38 through the resistor 36 cooperates with the source voltage at the ignition terminal 50 to bring the transistor 38 into its conducting state. The conduction of the transistor 38 permits the relay winding 42 to be energized from the source 14 through the ignition terminal 50 thereby to open the normally closed contacts 44. if, at that time, the key operating switch 48 is moved to the side of the starter terminal 52, this prevents the energization of the starter winding 54 because of the opening of the contacts 44. Thus the associated engine (not shown) cannot be started. This impossibility of starting the engine occurs either prior to time $t_1$ as shown in FIG. 2; that is to say, when the person does not sit on the seat or when the person does not fasten the seatbelt after he or she has sat on the seat.

When the person on the seat has fastened the seatbelt at time $t_3$, the output point $e$ is put at the ground potential as above described to maintain the transistor in its nonconducting state. This maintains the relay winding 42 deenergized to keep the contacts 44 in their closed position. Under these circumstances, the key operating switch 48 put on the side of the starter terminal 52 permits the associated engine (not shown) to be started through the starter winding 54 connected thereto through the contacts 44 in their closed position.

Figure 3:
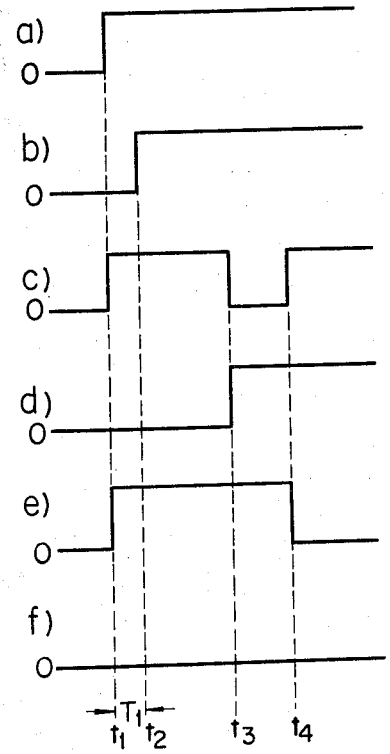
FIG. 3 is a graph similar ot FIG. 2 but illustrating waveforms in case the sitting following the seatbelt wear.

It is now assumed that the person sits on the seat after he or she has fastened the seatbelt. The operation of the arrangement as shown in FIG. 1 under the assumed condition will now be described with reference to FIG. 3, similar to FIG. 2. The belt switch 12 has been already closed to place the input point $c$ at the source voltage and the person sits on the seat at a time $t_1$ as shown in FIG. 3 to close the seat switch 10 and put the source point $a$ on the integrated circuit 34 at the source voltage with the input point $c$ as shown in FIGS. 3a and 3c. On the other hand, the input point $b$ will be at the source voltage at a time $t_2$ with a delay time $T_1$ (see FIG. 3), due to the resistor 18 and the capacitor 20 as above described in conjunction with FIG. 2. Therefore the output point $d$ is maintained at the ground potential while the output point $e$ is at source voltage at the time $t_2$ as shown in FIGS. 3d and 3e. Under these circumstances, the associated engine cannot be started as above described in conjunction with FIG. 2. If the seatbelt is released to open the belt switch at a time $t_3$ (see FIG. 3) lagging behind the time point $t_2$ and then put again in its fastened state at a time point of $t_4$ then the belt switch 12 is opened followed by the re-closure thereof. Therefore the point $d$ is put at the source voltage at and after the time point of $t_3$ and the point $e$ is set to ground potential at time point $t_4$ and thereafter as shown in FIGS. 3d and 3e. Under these circumstances, the associated engine can be started.

The operation of the arrangement as shown in FIG. 1 has been described with reference to FIGS. 2 and 3 wherein the junction $f$ of relay winding 42 and ignition terminal 50 is kept at the ground potential (see FIGS. 2f and 3f) indicating that the key operating switch 48 has its movable arm disengaged from the ignition terminal 50. However it is to be understood that the arrangement is similarly operated with the key operating switch 48 put on the side of the ignition terminal 50 before the person sits on the seat.

The situation next considered is that, after the person on the seat has fastened the seatbelt, he or she floats from the seat for the reasons such as above described. That is, it is assumed that the seat switch 10 is temporarily opened while the belt switch is in its closed position. The operation of the arrangement as shown in FIG. 1 under the assumed condition will now be described with reference to FIG. 4 wherein FIG. 4f shows the junction $f$ maintained at the ground potential indicating that the key operating switch 48 is not on the side of the ignition terminal 50.

Figure 4:
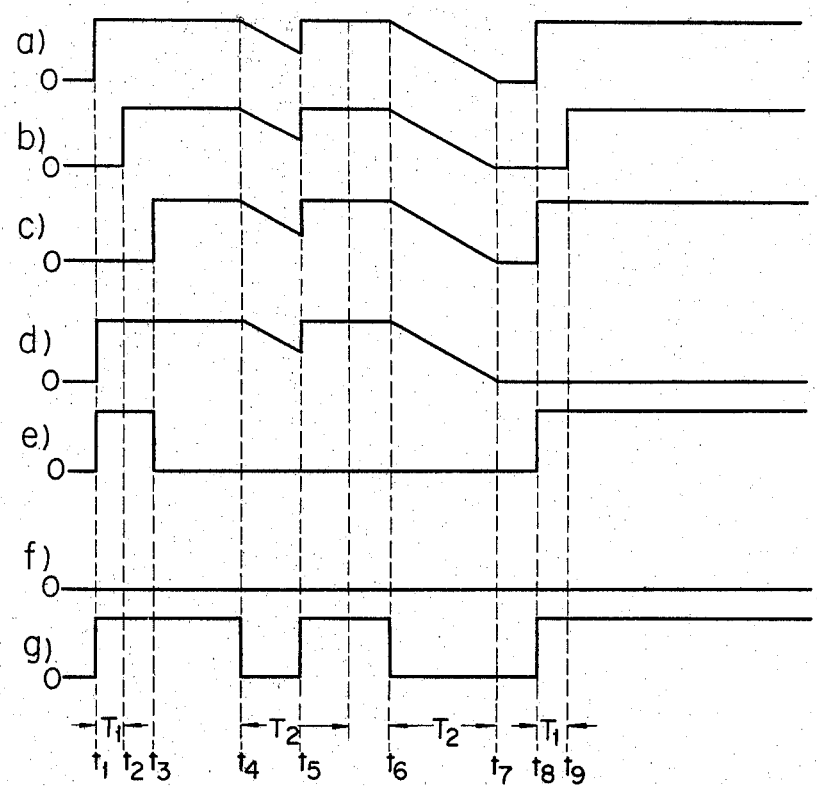
FIG. 4 is a graph similar to FIG. 2 but illustrating waveforms in the case where sitting is followed by the seatbelt wear and the seat switch shown in FIG. 1 chatters.

At a time $t_1$ as shown in FIG. 4 the person sits on the seat to simultaneously put the points $a$, $d$ and $e$ at the source voltage as shown in FIGS. 4a, 4d and 4e. Then the point $b$ is placed at the source voltage at a time point of $t_2$ with a delay time $T_1$ from time $t_1$ as in FIGS. 2 and 3 (see FIG. 4b). Thereafter the person wears the seatbelt at a time point of $t_3$ resulting in the point $e$ triggered to the ground potential (see FIG. 4e). It is assumed that, after the time point of $t_3$ and within a time interval between the time point of $t_4$ and a time point of $t_5$, the seat switch 10 chatters and is opened. Then the source point $a$ on the integrated circuit 34 is put at a charged potential on the capacitor 56 and follows that charged voltage within a discharge time $T_2$ of the compacitor 56 (see FIG. 4). When the point $e$ is at ground potential, indicating the proper fastening of the seatbelt, the output of the NOT gate 30 is put at the source voltage appearing at the source point $a$ because the ground potential at the point $e$ is fed back to the NOT gate 30. Also the point $b$ is maintained substantially at the source voltage. Therefore the point $b$ is still maintained at the potential of the point $a$ during the opening of the seat switch 10. If the chattering of the seat switch 10 terminates at a time $t_5$ in advance of the end of the discharge time $T_2$ to re-close the switch 10 then the point $e$ is at ground potential indicating that the driver continues to properly maintain the seatbelt in a at and after the time $t_5$. This is because at the time $t_5$, the integrated circuit 34 is maintained in its circuit status presented thereby prior to the chattering of the seat switch 10 or to the time point of $t_4$.

Where the seat switch 10 is again opened at a time $t_6$ and maintained in its open position for a time interval longer than the discharge time $T_2$ of the capacitor 56, the source point $a$ is put at the ground potential at a time $t_7$ the end of the discharge time $T_2$ (see FIG. 4a). Then the seat switch 10 is closed at a time $t_8$. At that time, the points $a$, $c$ and $e$ are put at the source voltage and the point $b$ is also set to the source voltage at a time $t_9$ with a delay time $T_1$ (see FIGS. 4a, 4c, 4e and 4b). Thereafter the point $e$ is maintained at the source voltage, indicating that the seatbelt is not properly worn by the driver although the driver properly wears the seatbelt. That is, a malfunction occurs due to the chattering of the seat operating switch 10. In order to avoid such a malfunction, the capacitor 56 can increase in capacitance to prolong the discharge time $T_2$. However a discharge time exceeding 30 seconds requires a high capacitance capacitor which is practically difficult.

FIG. 4g shows a change in voltage at the junction g of seat switch 10 and diode 16 plotted against time.

The arrangement of FIG. 1 eliminates this disadvantage as long as the key operating switch 48 has the movable arm connected to the ignition terminal 50 whereby the proper indication is obtained for a long opening time of the seat switch 10 though it would be infinitely long.

Figure 5:
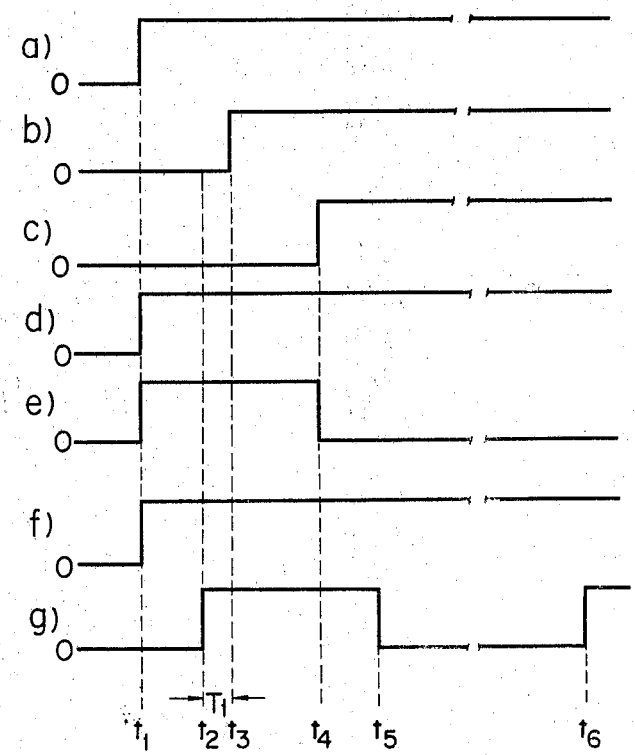
FIG. 5 is a graph similar to FIG. 2 and useful in explaining the operation and effect of the present invention.

With the key operating switch 48 put on its side of the ignition terminal 50, the operation of the arrangement will now be described with reference to FIG. 5. At a time $t_1$ as shown in FIG. 1, the source voltage is applied to the ignition terminal 50 to put the points $a$, $d$, $e$ and $f$ at the source voltage (see FIGS. 5a, 5d, 5e and 5f). Then the person sits on the seat at a time $t_2$ to closure the seat switch 10. This causes the junction $g$ to be set to the source voltage (see FIG. 5g) after which the point $b$ is set to the source voltage at a time $t_3$ with a delay time $T_1$ (see FIG. 5b). When the person on the seat put on the seat belt at a time $t_4$, the belt switch 12 is closed to set the points $c$ and $e$ to the source voltage while triggering the point $e$ from the source voltage to the ground potential, indicating the proper wearing of the seatbelt. Thereafter even if the seat switch 10 is opened for a time interval between the time points $t_5$ and $t_6$ much longer than the discharge time of the capacitor 56, the point $e$ is maintained at the ground potential as long as the junction $f$ is at the source voltage. Thus the arrangement continues to indicate and store that the person has properly worn the seatbelt.

Figure 6:
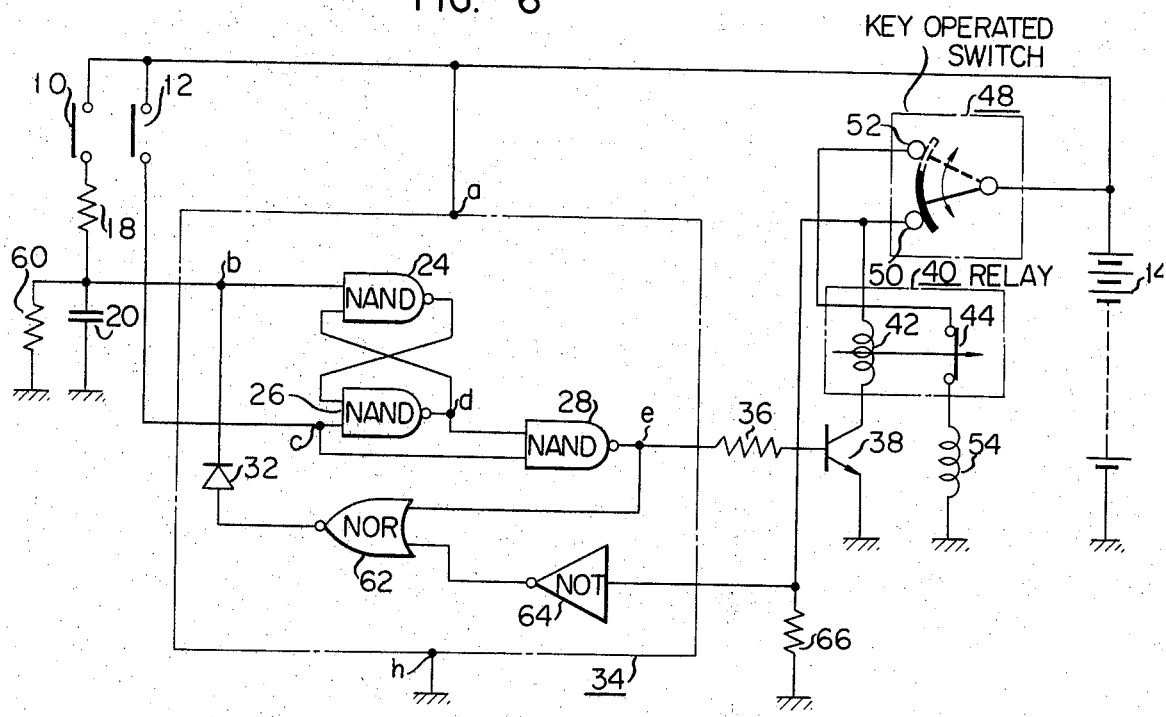
FIG. 6 is a schematic circuit diagram of a modification of the present invention.

In FIG. 6, wherein like reference numerals designate the components identical to those shown in FIG. 1, there is illustrated a modification of the present invention. In the arrangement illustrated, a resistor 60 is connected across the capacitor 20 with the parallel combination of capacitor and resistor 56 and 58 respectively omitted. The belt switch 12 and the source point $a$ are directly connected to the source 14 while the diodes 16, 32 and 46 shown in FIG. 1 are omitted. In the integrated circuit 34, a NOR gate 62 is substituted for the NOT gate 30 as shown in FIG. 1 and includes another input connected to an output of a NOT gate 64. The NOT gate 64 includes an input connected to the ignition terminal 50 and also to ground through a resistor 66. In other respects, the arrangement is identical to that shown in FIG. 1.

Figure 7:
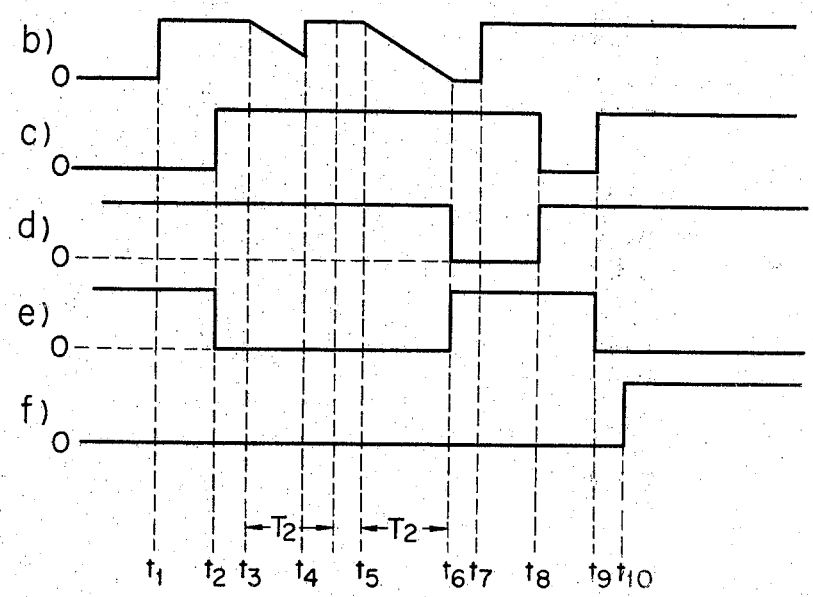
FIG. 7 is a graph illustrating waveforms developed at various points in the arrangment shown in FIG. 6.

The operation of the arrangement as shown in FIG. 6 will now be described with reference to FIG. 7. In the arrangement, the source point $a$ on the integrated circuit 34 is always connected to the source voltage and at a time $t_1$ as shown in FIG. 7 the person sits on the seat to close the seat switch 10 without any delay time (see FIG. 7b). At that time, the points $d$ and $e$ are at the source voltage as shown in FIGS. 7d and 7e, preventing the associated engine (not shown) from being started. Then at a time $t_2$ (see FIG. 7) the person put on the seatbelt to close the belt switch 12, thereby setting the point $c$ to the source voltage (see FIG. 7c). This triggers the point $e$ to the ground potential (see FIG. 7e) indicating that the person has properly put on the seatbelt. Therefore the engine (not shown) is permitted to be started. Thereafter the seat switch 10 may be opened, for the reasons as above described. Under these circumstances, assuming that the key operating switch 48 is not on the side of the ignition terminal 50, the input of the NOT gate 64 is at the ground potential to place the output of the NOR gate 62 at the ground potential. This prevents the ground potential at the point $e$ from being fed back to the input point $b$. The ground potential at the point e forms a signal indicating that the person has properly put on the seatbelt. After the opening of the seat switch 10 at the time $t_3$, the seat switch 10 may be again closed at a time $t_4$ within the discharge time $T_2$ of the capacitor 20. In that event the point $d$ is maintained at the source voltage, permitting the engine to be started. Thereafter if the seat switch 10 is opened for a time interval between time points $t_5$ and $t_7$ greater than the discharge time $T_2$ of the capacitor 20 then the point $b$ drops to the ground potential at a time $t_6$ at the end of the discharge time $T_2$. The seat switch 10 is again closed at the time $t_7$ whereupon the points $d$ and $e$ are put at the ground potential and source voltage respectively as shown in FIGS. 7d and 7e. Therefore the engine cannot be started. Then the seatbelt can be released at a time $t_8$ and again put in its fastened state at a time point of $t_9$. This permits the points $d$ and $e$ to be set to the source voltage and ground potential respectively (see FIGS. 7d and 7e). Thus the engine is enabled to be started.

Thereafter if the key operating switch 48 is moved to the side of the ignition terminal 50 at a time of $t_{10}$, then the input and output of the NOT gate 64 are put at the source voltage and ground potential respectively. Under these circumstances, the point $e$ is at the ground potential while the output of the NOT gate 64 is at the source voltage so that the point $b$ is substantially at the source voltage. Therefore even if the seat switch 10 is moved to its open position however long its opening time would be, the point $b$ is maintained at the source voltage as long as the ignition terminal 50 continues to be supplied with the source voltage. As a result, the point $d$ is placed at the source voltage while the point $e$ is put at the ground potential. This means that the circuit 34 continues to store an indication that the person is properly wearing the seatbelt and therefore the associated engine can be started.

From the foregoing it will be appreciated that the sensing system of the present invention will not cause a malfunction resulting from the chattering of the seat switch for a finite time interval prior to manually setting the key switch to the side of the ignition terminal. Further, with the key operated switch put on the side of the ignition terminal, the opening of the seat switch for any time interval does not lead to a malfunction after the person has properly worn the seatbelt. Rather the present system stores an indication proper seatbelt wear. Therefore no malfunction occurs even if a traveling motor vehicle vibrates on a rough road to cause a person riding therein to float above the seat. Also if the person does not properly wear the seatbelt, for example, if the seatbelt is released during the travel of the vehicle, then the person is frequently warned against his or her improperly or not wearing the seatbelt. Under these circumstances, the chattering of the seat switch is not accompanied by a malfunction. Therefore the present invention prevents the occurrence of such an objection that the person is warned against the seatbelt in spite of his or her proper wearing the seatbelt, with a simple circuit configuration.

While the present invention has been illustrated and described in conjunction with a few preferred embodiments thereof, it is to be understood that numerous changes and modification may be resorted to without departing from the spirit and scope of the invention.

What we claim is:

1. A sensor system for sensing a state of wear of a seat belt comprising, in combination, a first normally open seat switch adapted to be closed when sat on by a vehicle occupant, a second normally open switch adapted to be closed by the fastening of a seat belt, a FLIP-FLOP circuit including a pair of input terminals operatively coupled to said first and second switches respectively and an output, said FLIP-FLOP circuit being operated in response to the operation of either of said first and second switches, a time delay circuit interposed between one input to said FLIP-FLOP circuit and said first switch, a first gate circuit including a pair of inputs connected to the output of said FLIP-FLOP circuit and said second switch, respectively, and additional means are provided including a transistor operatively connected to said first gate circuit and responsive to an output signal from said first gate circuit, a starter relay including a winding connected to said transistor and a set of contacts connected to both a key operating switch and a starter winding, said set of contacts adapted to be open when said first switch is closed while said second switch is open, as well as when said second switch is closed followed by the closure of said first switch, thereby preventing operation of an associated engine and adapted to be closed when said second switch closes after said first switch closes, allowing activation of said engine, and means operatively coupled for preventing electric power from being supplied to said starter winding through said key operating switch once the associated engine is started.

2. A sensor system as claimed in claim 1 wherein said additional means further comprises a second gate circuit including an input connected to the output of said first gate circuit, and a first semiconductor diode including an anode electrode connected to the output of said second gate circuit and a cathode electrode connected to that input to said FLIP-FLOP circuit connected to said time delay circuit.

3. A sensor system as claimed in claim 1 wherein said additional means further comprises a second gate circuit including an input connected to an ignition switch, a third gate circuit including a pair of inputs connected to the output of said first gate circuit and the output of said second gate circuit, respectively, and a semiconductor diode including an anode electrode connected to the output of said third gate circuit and a cathode electrode connected to that input to said FLIP-FLOP circuit connected to said time delay circuit.

4. A sensor system as claimed in claim 1 wherein said additional means further comprises a second semiconductor diode including an anode electrode connected to said first switch, a third semiconductor diode including an anode electrode connected to an ignition switch, said second diode and said third diode including interconnected cathode electrodes and also being connected to a conductor to an electric source for said FLIP-FLOP circuit, and a parallel combination of a resistor and a capacitor, said parallel combination, said first gate circuit and said second gate circuit connected between said conductor to the electric source and ground.

* * * * *